US010379874B1

(12) United States Patent
Venkatasamy et al.

(10) Patent No.: US 10,379,874 B1
(45) Date of Patent: Aug. 13, 2019

(54) EXPEDITED RESUME PROCESS FROM LOW BATTERY

(71) Applicant: Amazon Technologies, Inc., Seattle, WA (US)

(72) Inventors: Vidhyananth Ramasamy Venkatasamy, Sunnyvale, CA (US); Haili Wang, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

(21) Appl. No.: 15/191,814

(22) Filed: Jun. 24, 2016

(51) Int. Cl.
G06F 1/32 (2019.01)
G06F 9/4401 (2018.01)
G06F 1/3212 (2019.01)
G06F 1/3296 (2019.01)

(52) U.S. Cl.
CPC .......... G06F 9/4418 (2013.01); G06F 1/3212 (2013.01); G06F 1/3296 (2013.01)

(58) Field of Classification Search
CPC .................................................... G06F 9/4418
USPC ........................................................ 713/323
See application file for complete search history.

(56) References Cited

U.S. PATENT DOCUMENTS

| 6,609,182 B1* | 8/2003 | Pedrizetti | G06F 9/4418 |
| | | | 711/133 |
| 2003/0057918 A1* | 3/2003 | Aoki | G01R 31/3624 |
| | | | 320/136 |
| 2006/0059380 A1* | 3/2006 | Kimura | G06F 11/1441 |
| | | | 713/323 |
| 2008/0157924 A1* | 7/2008 | Batra | G06K 19/0716 |
| | | | 340/10.1 |
| 2009/0237388 A1* | 9/2009 | Seki | G06F 1/3228 |
| | | | 345/211 |
| 2009/0286578 A1* | 11/2009 | Nagasawa | H04W 52/0277 |
| | | | 455/574 |
| 2012/0096256 A1* | 4/2012 | Kim | G06F 9/4418 |
| | | | 713/2 |
| 2013/0076653 A1* | 3/2013 | Selim | G06F 3/1438 |
| | | | 345/173 |
| 2016/0041597 A1* | 2/2016 | Graham | G06F 1/3212 |
| | | | 713/323 |
| 2017/0185416 A1* | 6/2017 | Chang | G06F 9/442 |

* cited by examiner

Primary Examiner — Jaweed A Abbaszadeh
Assistant Examiner — Sumil M Desai
(74) Attorney, Agent, or Firm — Pierce Atwood LLP

(57) ABSTRACT

Devices, systems and methods are disclosed for quickly readying a device when charging a dead battery. For example, a device may enter a hibernation mode when the battery becomes critically low and may resume normal operation from the hibernation mode when an external power source is connected to the device. While the battery is critically low but the device is connected to the external power source, the device may generate a visible indication, such as a watermark, and apply the watermark to content to allow a user to control the device while indicating to the user that the battery is critically low and should not be removed from the external power source. Thus, the device may reduce user-perceived latency from when the external power source is connected to when the device resumes system interactivity (e.g., being responsive to user input).

23 Claims, 11 Drawing Sheets

FIG. 2A
FIG. 2B
No power
212
Persistent Content
210
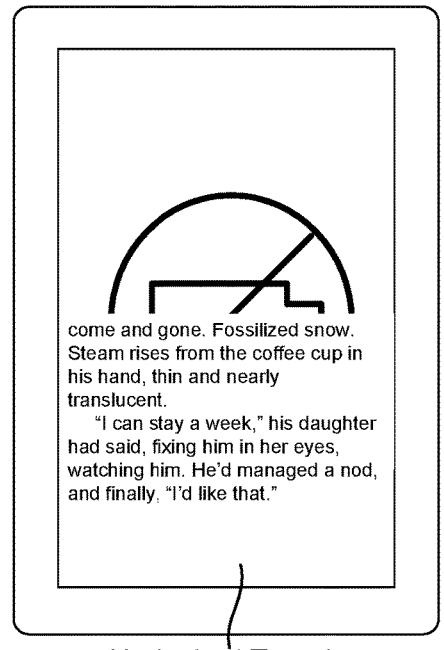
Undesired Transient
Content
220
FIG. 2C
FIG. 2D
System
Booting
232
Outdated Content
230
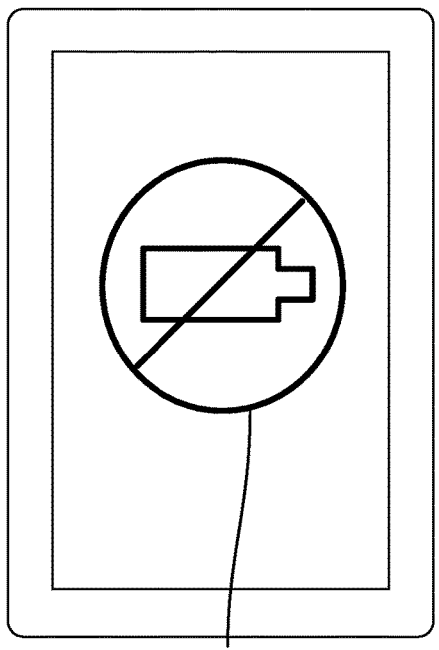
Critical Battery Indicator
240

FIG. 3A
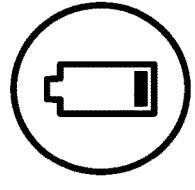 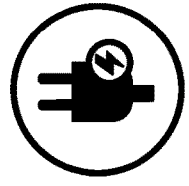 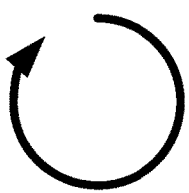 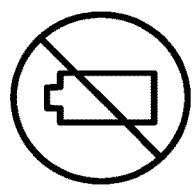
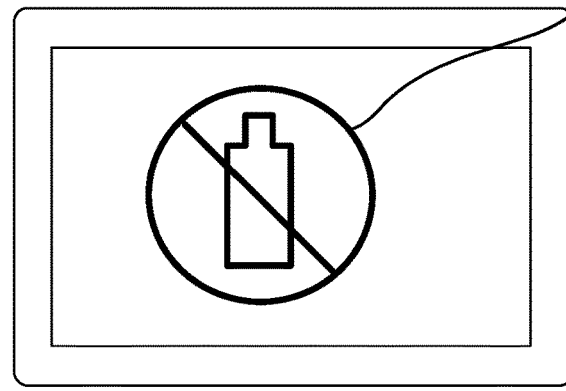 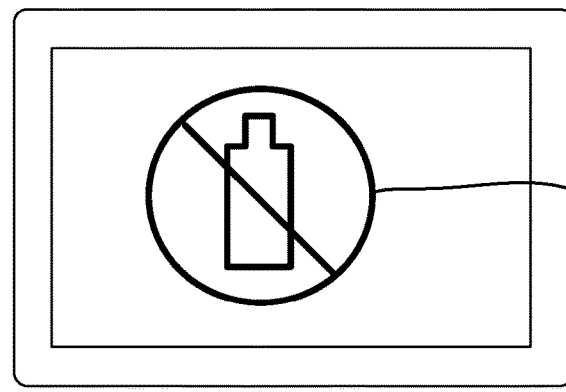 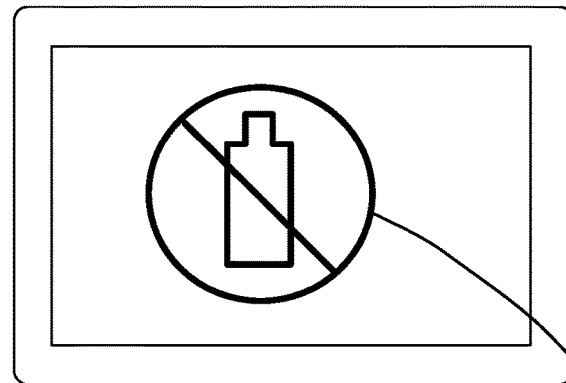 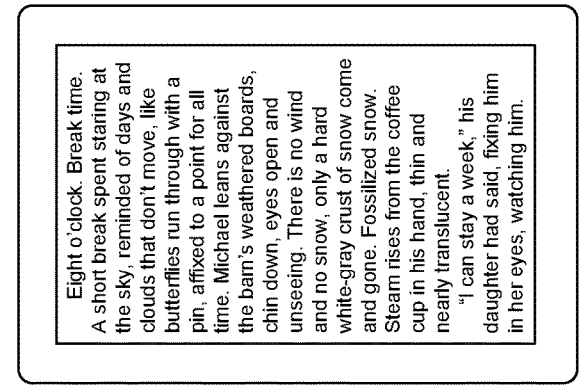
No power 320 | System Booting 322 | System Charging 324 | Minimum Battery Level 326 | Updated Content 330
Critical Battery Indicator 310

FIG. 4
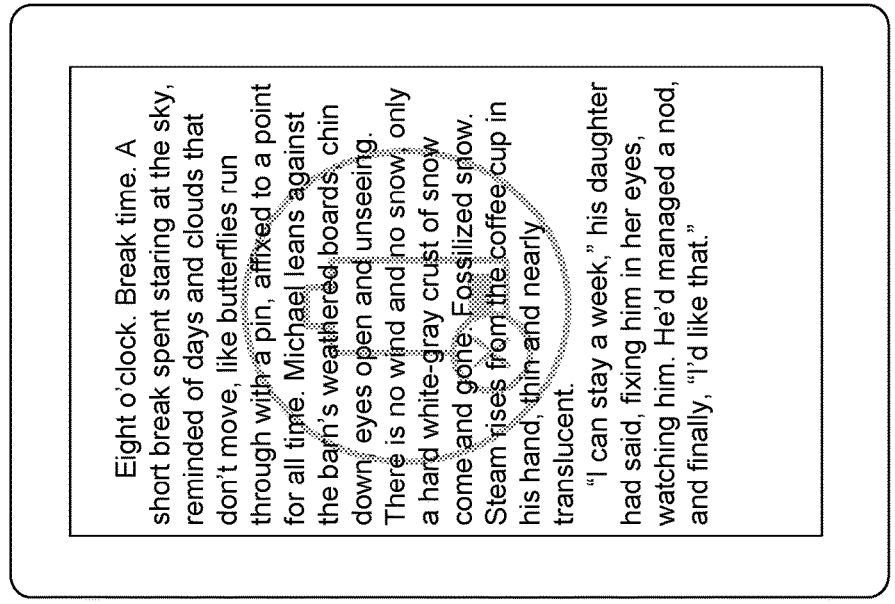
Watermarked Content
420
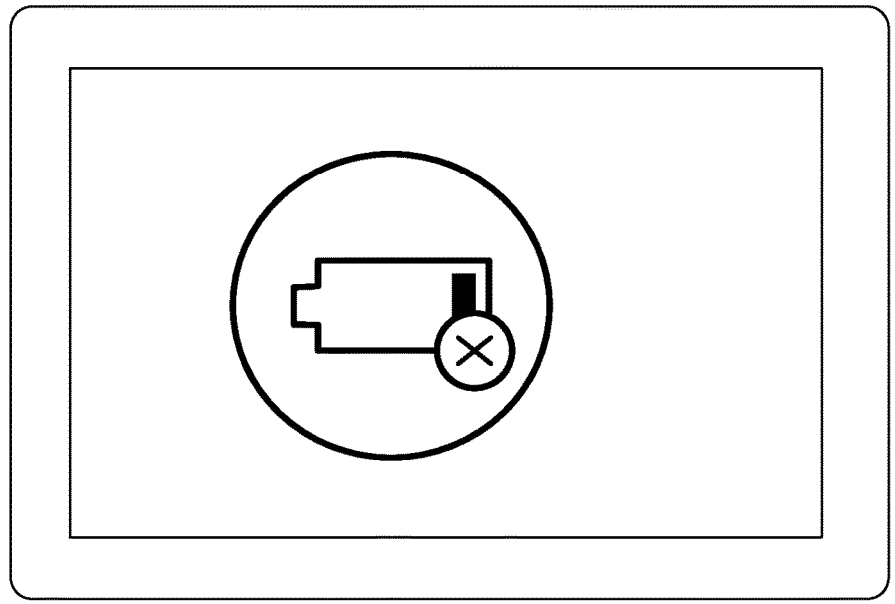
Low Battery Watermark
410

FIG. 5
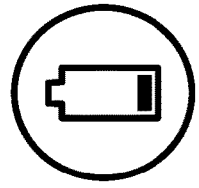
Minimum Battery Level
516
System Charging
514
Hibernation Restore
512
No power
510
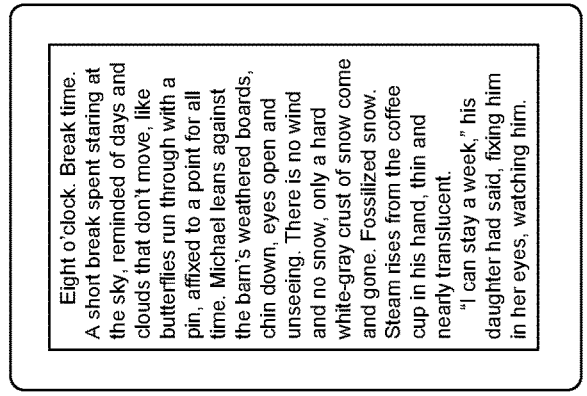
Updated Content
330
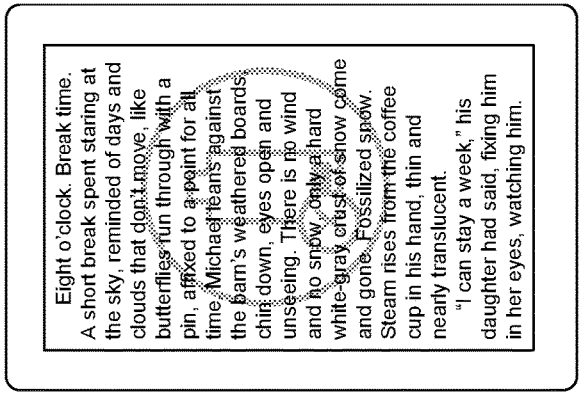
Watermarked Content
532
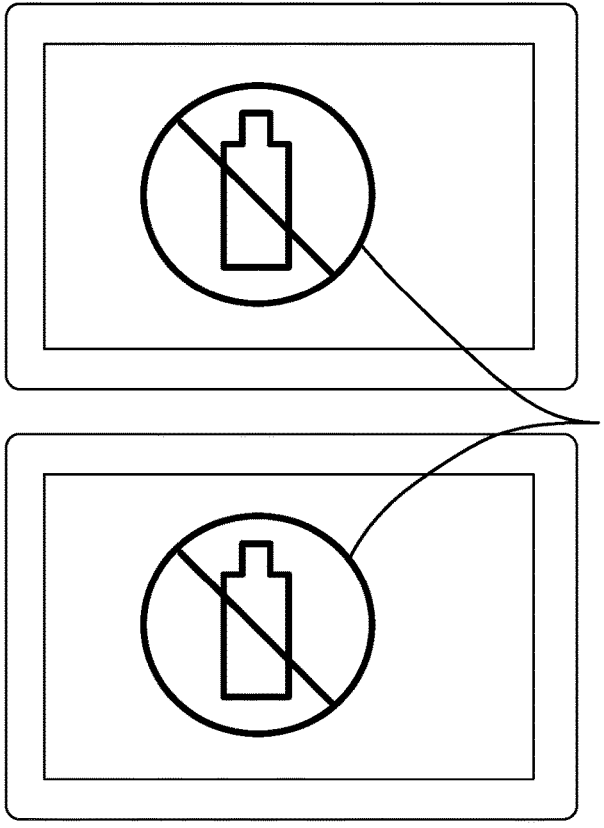
Critical Battery Indicator
530

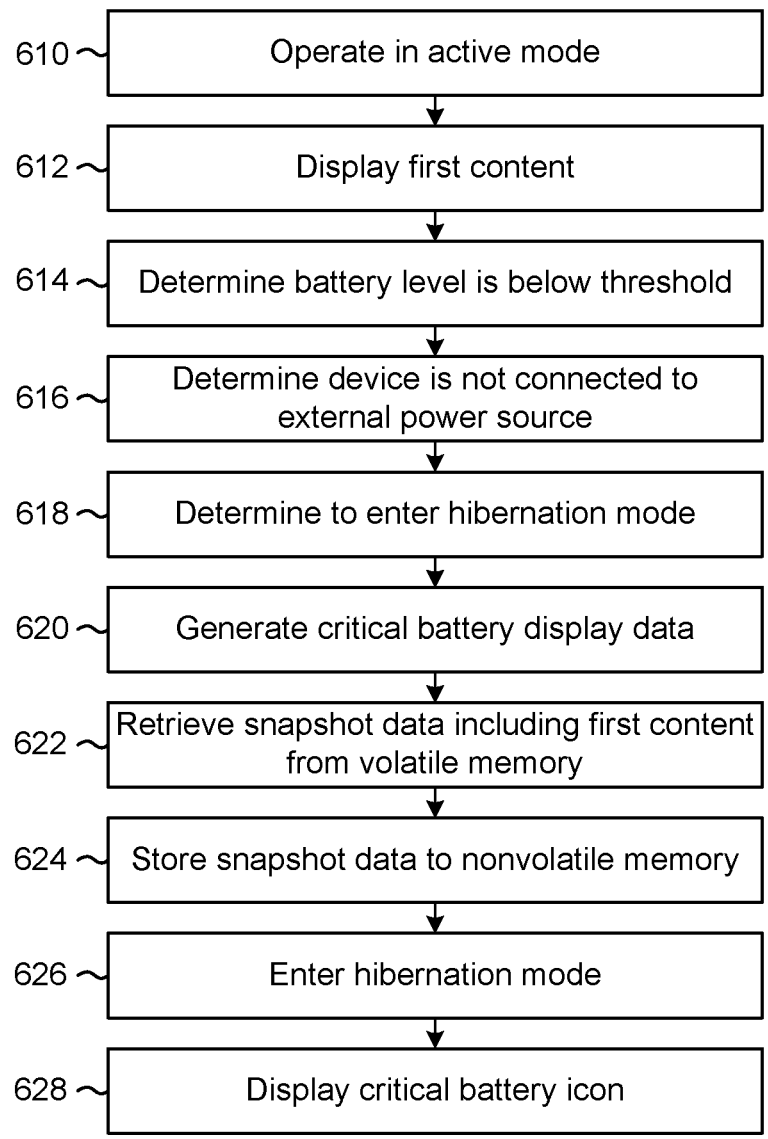

US 10,379,874 B1

EXPEDITED RESUME PROCESS FROM LOW BATTERY

BACKGROUND

With the advancement of technology, the use and popularity of electronic devices has increased considerably. Mobile electronic devices may be turned off when battery charge levels become critically low.

BRIEF DESCRIPTION OF DRAWINGS

For a more complete understanding of the present disclosure, reference is now made to the following description taken in conjunction with the accompanying drawings.

FIGS. 2A-2D illustrate examples of displaying content on a device while battery levels are low.

FIGS. 3A-3C illustrate an example and a flowchart conceptually illustrating a boot process when a device is charging from critical battery levels.

FIG. 4 illustrates examples of a watermark and watermarked content according to embodiments of the present disclosure.

FIG. 5 illustrates an example of a resume process when a device is charging from critical battery levels according to embodiments of the present disclosure.

FIG. 6 is a flowchart conceptually illustrating an example method for entering a hibernation mode when battery levels are critical according to embodiments of the present disclosure.

DETAILED DESCRIPTION

Electronic devices, such as electronic readers, commonly include a battery and an electronic ink display that is capable of maintaining content without any active power. It is not uncommon for an electronic reader device to operate for an extended period of time without being booted due to the length of time such a device may go between charges. When a battery charge level of a device becomes critically low (e.g., below 5-10% battery life remaining), the device may display a critical battery screen and turn off, becoming unresponsive to a user. After being connected to a battery charger, the device may boot (e.g., start an operating system of the device) while displaying updates to notify the user that the device is booting. The booting process may require a length of time (e.g., one minute) before resuming system interactivity (e.g., device responding to user input), and if the battery charger is removed while the battery charge level is critically low, the device may not have enough battery power to update the display to show the critical battery screen. This may result in undesired content being displayed on the screen, such as progress updates that are not accurate and/or screens that are incomplete, and the device remains unresponsive to the user until the battery charger is reconnected and the system is booted again.

Typically, this situation is avoided by preventing the device from reaching system interactivity until the battery reaches a certain threshold (e.g., 10% battery life remaining). Thus, the user cannot interact with or control the device until the battery level reaches the threshold. While this avoids the possibility of undesired content being displayed on the screen or the user getting confused if the battery goes dead before the screen's display can be updated to let the user know the batter is dead, this results in a longer length of time (e.g., 10-20 minutes, depending on charging rate) before resuming system interactivity.

To reduce a length of time until system interactivity when charging a dead or low battery, devices, systems and methods are disclosed for entering a hibernation mode when the battery charge level is critically low and applying a low battery watermark on all display updates until the battery reaches the threshold. By entering the hibernation mode, the device may resume normal system interactivity in a relatively short period of time (e.g., 5-6 seconds) relative to system booting (e.g., starting the operating system). Once the device reaches system interactivity, the device may apply the low battery watermark or other indicator to a display indicating to the user to not remove the battery charger. In addition, if the battery charger is removed, the device will continue to display the low battery watermark, indicating to the user that the battery level is critically low without displaying undesired content and/or consuming additional power by displaying the critical battery screen.

Figure 1:
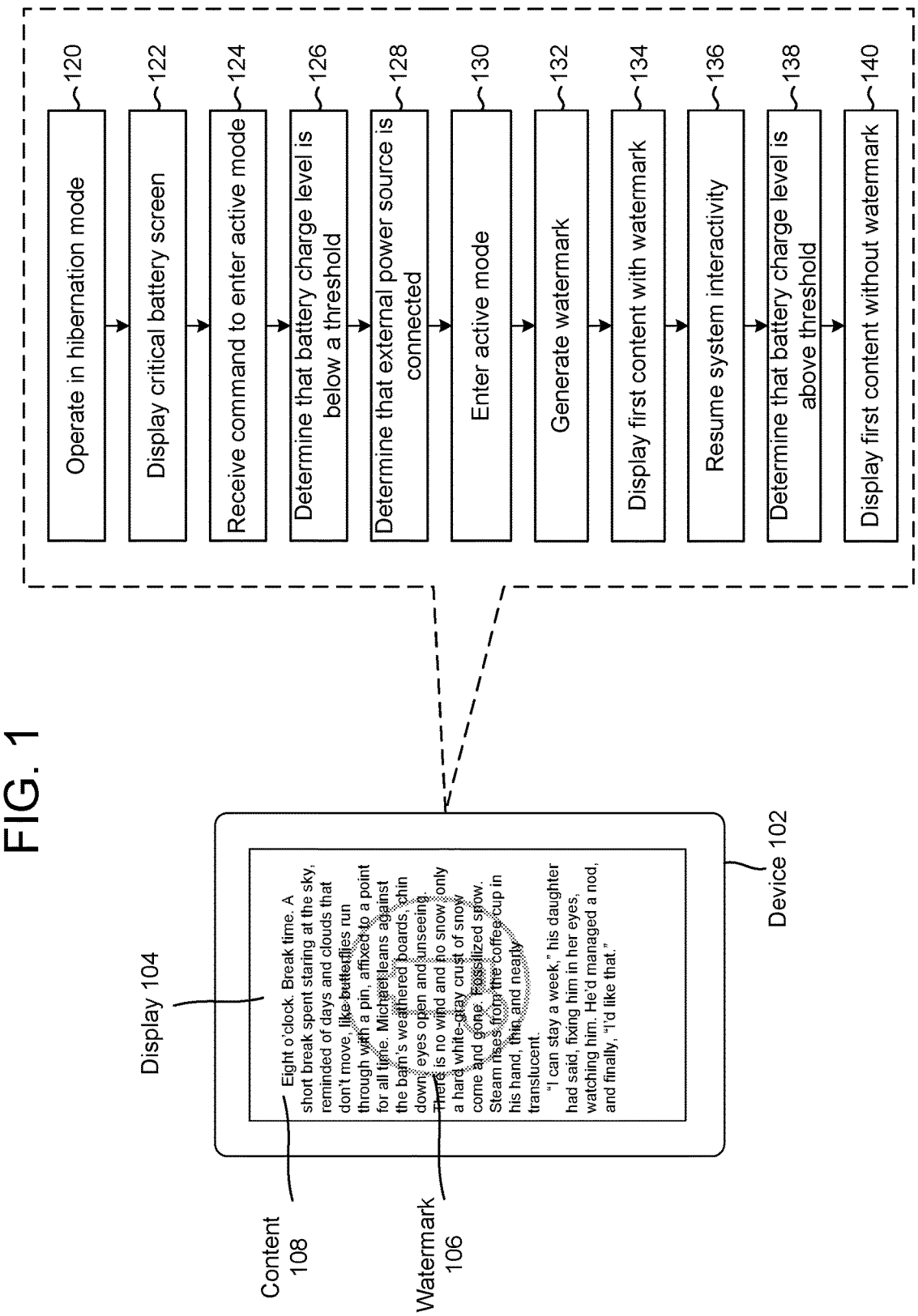
FIG. 1 illustrates an overview of a system for implementing embodiments of the present disclosure.

FIG. 1 illustrates an overview of a system for implementing embodiments of the present disclosure. The system includes a device 102, such as an electronic reader or the like, having a display 104. The display 104 may be an electrophoretic display, an electrowetting display and/or other low-power, high-latency displays (e.g., electronic ink or e-ink displays) known to one of skill in the art that is capable of maintaining content without active power. In contrast to liquid crystal display (LCD), light-emitting diode (LED) and other high-power, low-latency displays that refresh quickly (e.g., 10 ms) and have low current consumption but lose content without active power, high-latency displays refresh slowly (e.g., 100+ ms) and have large current consumption but maintain the content without active power, enabling the display 104 to display content even when a battery of the device is dead and/or critically low.

The device 102 may operate in an active mode (e.g., normal operation, requiring high power consumption but offering all system functionality), a suspended mode (e.g., low power consumption, very short time to resume system interactivity), a hibernation mode (e.g., extremely low power consumption, short time to resume system interactivity) and/or an "off" mode (e.g., no power consumption, long time to resume system interactivity. When a battery charge level of a battery of the device 102 becomes critically low (e.g., below 87% of maximum voltage for the battery, 3.5-3.65V, 5-10% battery life remaining or the like), the device 102 may generate and display a critical battery screen indicating to a user of the device 102 that the battery charge level is critically low and then the device 102 may enter the hibernation mode. Due to the battery charge level being critically low, a relatively high power consumption of the active mode and the suspended mode may result in the battery being exhausted and the device 102 entering the "off" mode. In contrast, the hibernation mode enables the device 102 to consume very little power but resume system interactivity in a short period of time as the device 102 does not need to start an operating system and/or perform other initialization steps prior to displaying content and becoming interactive to the user.

After being connected to an external power source, such as a battery charger, the device 102 may resume system interactivity (e.g., enter the active mode) from the hibernation mode in a short period of time. For example, the device 102 may load data from nonvolatile memory to volatile memory and restore settings of the device 102 so that the device 102 resumes system interactivity at a point where the device 102 entered the hibernation mode. Thus, instead of starting the operating system of the device 102 and performing other initialization steps that require a relatively long period of time (e.g., one minute or longer), the device 102 may resume system interactivity in a short period of time (e.g., 5-6 seconds). In addition, the device 102 may generate a watermark 106 (e.g., visible indication) indicating to the user that the battery charge level is critically low and that the device 102 should remain connected to the external power source. The device 102 may apply the watermark 106 to any content displayed on the display 104 until the battery charge level reaches a certain threshold (e.g., 10% battery life remaining), such as content 108. Thus, if the external power source is removed, the display 104 will display the watermark 106 and indicate to the user that the battery charge level is critically low without requiring the device 102 to consume additional power to update the display 104 to a critical battery screen. Instead of requiring a relatively long period of time (e.g., 10-20 minutes) without system interactivity for the external power source to charge the battery above the threshold, the device 102 may resume system interactivity in a short period of time (e.g., 5-6 seconds), improving a user experience.

As illustrated in FIG. 1, the device 102 may operate (120) in a hibernation mode and reduce a power consumption of the device 102 by removing power to components in the device 102. The device 102 may display (122) a critical battery screen while in the hibernation mode, indicating to a user of the device 102 that a battery charge level of the device 102 is critically low. The device 102 may receive (124) a command to exit the hibernation mode and resume normal system operation in an active mode. For example, the command may be a wake-up event, a physical press of a power button, detecting that an external power source is connected or the like that triggers the device 102 to exit the hibernation mode.

The device 102 may determine (126) that a battery charge level of the device 102 is below a threshold (e.g., 3.5-3.65V, 5-10% or the like), may determine (128) that an external power source is connected and may enter (130) the active mode from the hibernation mode. For example, the device 102 may load data from nonvolatile memory to volatile memory and resuming system interactivity from where the device 102 entered the hibernation mode. The device 102 may generate (132) a watermark indicating that the battery charge level is critically low, may display (134) first content with the watermark, and may resume (136) system interactivity (e.g., the device 102 is responsive to user input). For example, the device 102 may initially load a page of content from an electronic book that was previously displayed when the device 102 entered the hibernation mode and may display the page of content with the watermark. The device 102 may receive additional inputs from the user and may display other content with the watermark overlaid on the content.

After the external power source has charged the device 102, the device 102 may determine (138) that a battery charge level is above the threshold (e.g., 3.5-3.65V, 5-10% battery life remaining or the like) and may display (140) first content without the watermark. Thus, the device 102 may resume normal operation without applying the watermark to displayed content.

In addition to displaying the watermark, the device 102 may limit functionality while the battery charge level is below the threshold. For example, the device 102 may identify and restrict applications and/or processes associated with a high power consumption. Thus, the device 102 may enter a battery restricted mode and avoid high current draws by limiting functionality performed by an application and/or stopping (e.g., closing, ending, exiting) an application that is associated with a high current draw. The device 102 may stop limiting functionality when the battery charge level is above the threshold. In some examples, the device 102 may stop limiting functionality (e.g., exit the battery restricted mode) when the battery charge level is above a second threshold different than the threshold. Thus, the device 102 may display content without watermarks while limiting functionality (e.g., second threshold is larger than the threshold) or may display content with watermarks without limiting functionality (e.g., second threshold is lower than the threshold) without departing from the disclosure.

To reduce power consumption and therefore increase a battery life of the device 102, the device 102 may disable components and enter a low power consumption mode. When the device 102 disables a component or disables power to the component, the device 102 is turning off, powering off or otherwise disabling the component so that the component does not consume power. While the component is disabled, the component is unable to perform normal operation and certain features of the device 102 are therefore unavailable. Thus, the device 102 may disable components to reduce the power consumption during periods of inactivity or when the battery charge level is critically low.

Examples of a low power consumption mode include a suspended mode and/or a hibernation mode. The suspended mode has lower power consumption than normal system operation (e.g., active mode) but maintains power to certain components and maintains data stored in volatile memory, allowing the device 102 to resume normal system operation (e.g., system interactivity) after a short period of time. In contrast, the hibernation mode has even lower power consumption than the suspended mode but resuming normal system operation (e.g., system interactivity) requires a slightly longer period of time. For example, the hibernation mode reduces power consumption by copying a snapshot of data stored in the volatile memory into nonvolatile memory and disabling additional components, such as the volatile memory. In order to resume normal system operation, the device 102 must copy the snapshot from the nonvolatile memory back to the volatile memory prior to system interactivity (e.g., responsiveness to input from a user) corresponding to an active mode.

The device 102 may include an integrated circuit (IC), volatile memory (e.g., random-access memory (RAM) such as double data rate synchronous dynamic random-access memory (DDR SDRAM)) and/or nonvolatile memory (e.g., hard drive, solid state drive or the like such as an embedded multimedia card (eMMC)). The IC may include on-chip memory (e.g., RAM), a central processing unit (CPU), L2 cache, peripherals (e.g., Universal Serial Bus (USB), general purpose input/output (GPIO), Inter-Integrated Circuit (I2C), electrophoretic display controller (EPDC), secure digital high capacity (SDHC), ultra SDHC (uSDHC) or the like) and clock circuitry. In the active mode, the IC (including on-chip memory, CPU, L2 cache, peripherals and clock circuitry), the volatile memory and the nonvolatile memory will be powered on and functioning normally. In the off mode, the IC, the volatile memory and the nonvolatile memory will be powered off.

In the suspended mode, the device 102 may stop the CPU (e.g., place the CPU into a low power consumption mode), gate clocks generated by the clock circuitry, place the volatile memory in a low power consumption mode and disable power to the L2 cache and the nonvolatile memory. However, the device 102 may maintain power to the on-chip memory and the peripherals. Thus, the device 102 may maintain power to multiple rails without providing a lot of current, reducing power consumption of the device 102.

In the suspended mode, the volatile memory is inaccessible to the device 102, such that the device 102 cannot access data stored in the volatile memory, but the volatile memory self-refreshes the data using an internal timer so that the data stored in the volatile memory is maintained. When the clocks are gated, a majority of the clocks are maintained at a fixed level without high frequency oscillations, resulting in low power consumption. As the clocks 15 are gated, the peripherals are not operating but register settings are preserved because power is maintained to the peripherals 214. While the nonvolatile memory is disabled, data stored in the nonvolatile memory is maintained until the device 102 resumes system interactivity following a restore command (or other event trigger associated with a wake-up event). Upon receiving the restore command, the device 102 may be unresponsive to a user until the components are enabled and functioning.

The suspended mode may reduce power consumption to a first value (e.g., 650 mA) and may resume system interactivity after a first period of time (e.g., 2 seconds). In contrast, a hibernation mode may reduce power consumption to a second value smaller than the first value (e.g., 100 mA) and resume system interactivity after a second period of time longer than the first period of time (e.g., 6 seconds).

In the hibernation mode, the device 102 may disable power to the on-chip memory, the CPU, the L2 cache, the peripherals, the clock circuitry, the volatile memory, and the nonvolatile memory. When the nonvolatile memory is disabled, data stored in the nonvolatile memory is maintained. However, when the volatile memory is disabled, data stored in the volatile memory is not maintained. Similarly, data stored in the on-chip memory, register settings stored in the peripherals and/or other data is not maintained during the hibernation mode. Therefore, the device 102 must copy data from the volatile memory, the on-chip memory, the peripherals and/or other components to the nonvolatile memory prior to entering the hibernation mode. Thus, the nonvolatile memory may store a snapshot or snapshot data that enables the device 102 to restore data to the volatile memory, data to the on-chip memory, register settings to the peripherals and/or other data or settings prior to resuming system interactivity. Upon receiving a restore command (or other event trigger associated with a wake-up event), the device 102 may be unresponsive to a user until the components are enabled and the snapshot data is loaded into the on-chip memory, peripherals, volatile memory and/or other components.

To generate the snapshot or snapshot data (e.g., active data), the device 102 may store data associated with kernel memory (e.g., memory associated with the OS) as a first portion of the snapshot and data associated with user space processes (e.g., memory associated with processes running on the device 102) as a second portion of the snapshot. For example, the device 102 may first store data stored in the user space processes portion of the memory as the second portion of the snapshot. The device 102 may then generate an atomic copy of data stored in the kernel memory by freezing contents of volatile memory, freezing a user state and/or freezing state(s) of the input/output system corresponding to each process running on the device 102. As used herein, freezing contents refers to capturing the contents at a fixed time, such as when the hibernation command is received or after storing the second portion of the snapshot. In some examples, the frozen data may be copied to generate an atomic copy that will not change. For example, data stored in the kernel memory may be copied to the user space processes and/or free memory. If the data stored in the kernel memory is not copied to the user space processes and/or the free memory, the data may be changed or modified when generating the snapshot, such that a first portion of the snapshot does not correspond to the data stored in the kernel memory at the fixed time. For example, copying data stored in the kernel memory without first saving an atomic copy may change values, counter values, which sector saved, etc. associated with a state of the device. To generate the atomic copy, once data stored in the user space processes is stored as the second portion of the snapshot, the device 102 may copy the data stored in the kernel memory to the user space processes and/or the free memory using program code that performs memory to memory copying without changing a state of the memory itself.

As discussed above, the display 104 may be capable of maintaining content without active power. FIG. 2A illustrates persistent content 210 that can be maintained with no power 212, such as when there is no active power (e.g., external power source) and a battery of the device 102 is exhausted (e.g., 0% battery life remaining). However, if the device waits until the battery is exhausted to shut down, the content displayed on the display 104 when the battery is exhausted may be invalid, such as undesired transient content 220 illustrated in FIG. 2B and/or outdated content 230 illustrated in FIG. 2C. For example, the undesired transient content 220 may be caused by the battery being exhausted before the display 104 is fully updated, whereas the outdated content 230 is previous content displayed on the display 104 that is continued to be displayed during system booting 232. Thus, the display 104 displays content to the user that is not reflective of a current status of the device and doesn't indicate to the user that the battery charge level of the device is critically low. To alleviate these problems, the device may generate a critical battery indicator 240, illustrated in FIG. 2D, to display on the display 104 prior to the battery being exhausted. For example, the device may determine that the battery charge level reaches a threshold (e.g., 3.5-3.65V, 5-10% battery life remaining or the like), generate the critical battery indicator 240 and shut down prior to exhausting the battery (e.g., 0% battery life remaining).

When an external power source is connected to the device, the device may boot (e.g., start an operating system of the device) and resume system interactivity without displaying the critical battery indicator 240. However, if the external power source is disconnected from the device, the device may not have the battery power required to update the display 104 to display the critical battery indicator 240 and the display 104 may display invalid content (e.g., undesired transient content 220 and/or outdated content 230).

FIG. 3A illustrates a typical technique to alleviate the risk of displaying invalid content due to critical battery charge levels. As illustrated in FIG. 3A, the device may display a critical battery indicator 310 when the battery is exhausted and the device is off. Thus, the device displays the battery indicator during periods of no power 320 (e.g., no active power from an external power source and the battery is exhausted). The device may detect that an external power source is connected to the device and begin system booting 322 (e.g., restarting an operating system of the device), which may take 1-2 minutes to complete. However, the device continues to display the critical battery indicator 310 during the system booting 322 and system charging 324 (e.g., external power source charges the battery of the device) until a minimum battery level 326 is reached (e.g., a battery charge level exceeds a threshold). After the minimum battery level 326 is reached, the device may become responsive and display updated content 330. For example, the device may not become interactive until the battery charge level reaches a threshold (e.g., 10% battery life remaining), which may take 10-20 minutes depending on a charging rate of the device.

Figure 3B:
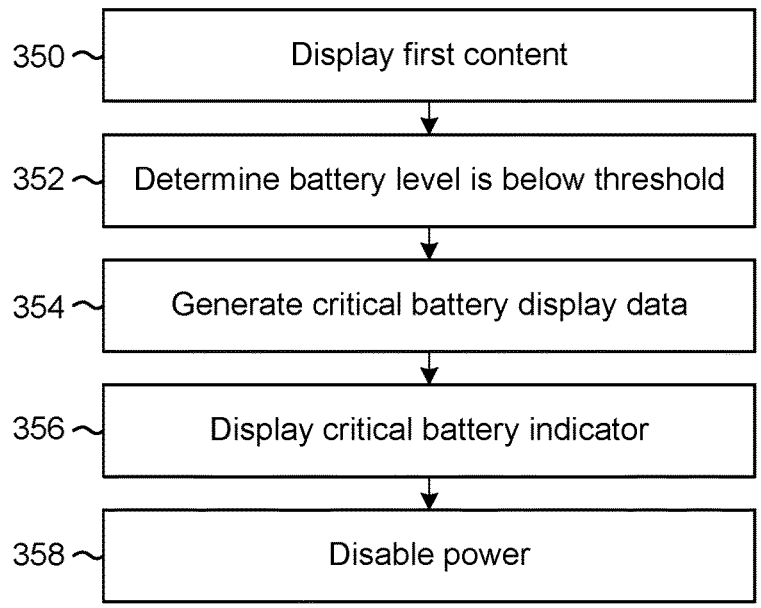
Figure 3C:
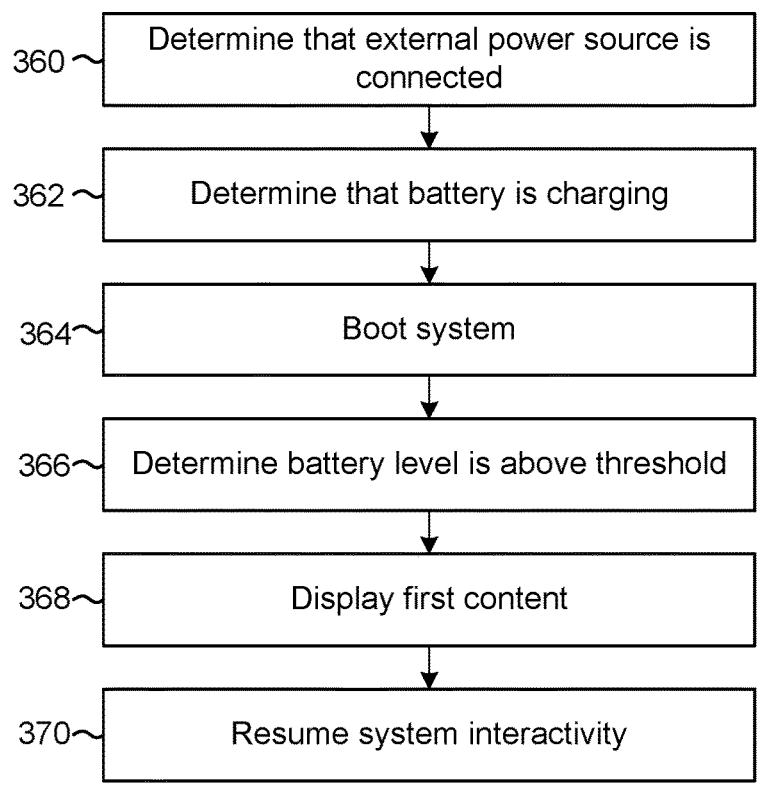

FIGS. 3B-3C are flowcharts conceptually illustrating this technique. As illustrated in FIG. 3B, the device may display (350) first content, determine (352) a battery charge level is below a threshold, generate (354) critical battery display data corresponding to the critical battery indicator 310, display (356) the critical battery indicator 310 and disable (358) power to the device. The device may continue to display the critical battery indicator 310 while the power is disabled. As illustrated in FIG. 3C, when an external power source is connected to the device, the device may determine (360) that the external power source is connected to the device, determine (362) that the battery is charging, boot (364) the system, determine (366) that a battery charge level is above the threshold, display (368) the first content and resume (370) system interactivity. Thus, the device displays the critical battery indicator 310 until the battery charge level is above the threshold, at which point the device displays the first content again.

FIG. 4 illustrates examples of a watermark and watermarked content according to embodiments of the present disclosure. To reduce a length of time until system interactivity when charging a dead battery, a device 102 may generate and apply a low battery watermark 410 (e.g., visible indication) on all display updates until the battery charge level reaches the threshold (e.g., 10%). For example, the display 104 may display watermarked content 420. Thus, instead of preventing system interactivity until the battery charge level reaches the threshold, the device 102 may allow system interactivity while applying the low battery watermark 410. If the external power source is disconnected, the display 104 indicates to the user that the battery charge level is critically low via the low battery watermark 410 without needing to update the display to a critical battery indicator.

FIG. 5 illustrates an example of a resume process when a device is charging from critical battery levels according to embodiments of the present disclosure. As illustrated in FIG. 5, the device 102 may determine that a battery charge level is below a threshold and that there is no active power (e.g., from an external power source) and may enter a hibernation mode. During the hibernation mode with no power 510 (e.g., no active power from an external battery source and the battery is below the threshold), the device 102 may display a critical battery indicator 530. The device 102 may detect that an external power source is connected to the device 102 and may begin hibernation restore 512 (e.g., resuming normal operation to enter active mode from hibernation mode), which may take a shorter period of time (e.g., 5-10 seconds) relative to the system booting 322 (e.g., 1-2 minutes). The device 102 may continue to display the critical battery indicator 530 until the device 102 enters the active mode from the hibernation mode and resumes normal operation. Once the device 102 restores normal operation, the device 102 may generate a low battery watermark, display watermarked content 532 and become responsive to the user during system charging 512 (e.g., external power source charges the battery of the device 102). Thus, the device 102 may display the watermarked content 532 during the system charging 516 until a minimum battery level 518 is achieved (e.g., a battery charge level exceeds a threshold, such as 10% battery life remaining). After the minimum battery level 518 is reached, the device 102 may display updated content 534 without the low battery watermark. Thus, the device 102 allows the user to control the device 102 prior to the battery charge level reaching the threshold by displaying watermarked content 532. For example, the user may read an electronic book and the device 102 may display pages of content in the electronic book with the watermark, allowing the user to change pages while indicating to the user that the battery charge level is critically low.

While FIGS. 4-5 illustrate examples of a low battery watermark 410 being applied to watermarked content 420 and watermarked content 532, the disclosure is not limited thereto and the watermark may vary. For example, the watermark may include text (e.g., indicating a battery charge level, indicating to the user to not remove the external power source, or the like) or other graphical icons, a position of the watermark may vary and/or there may be multiple watermarks or icons included in the watermark without departing from the disclosure.

FIG. 6 is a flowchart conceptually illustrating an example method for entering a hibernation mode when battery levels are critical according to embodiments of the present disclosure. As illustrated in FIG. 6, the device 102 may operate (610) in an active mode and display (612) first content to the user. As the battery gets critically low, the device 102 may determine (614) that a battery charge level is below a threshold (e.g., 87% of maximum voltage for the battery, 3.5-3.65V, 5-10% battery life remaining or the like), determine (616) that the device 102 is not connected to an external power source and may determine (618) to enter hibernation mode.

The device 102 may generate (620) critical battery display data, retrieve (622) snapshot data including first content from volatile memory, store (624) the snapshot data to nonvolatile memory, enter (626) the hibernation mode and display (628) a critical battery icon corresponding to the critical battery display data while in the hibernation mode. Thus, while the device 102 is in hibernation mode the display 104 may display the critical battery icon indicating to a user that the battery is critically low.

The snapshot data (e.g., active data) may include data corresponding to the first content that was previously displayed on the display 104, along with additional data stored in volatile memory, data stored in on-chip memory, register settings stored in the peripherals and/or other data that isn't maintained when power is disabled. As discussed above, the device 102 may disable power to the on-chip memory, the CPU, the L2 cache, the peripherals, the clock circuitry, the volatile memory, and the nonvolatile memory in the hibernation mode. When the nonvolatile memory is disabled, data stored in the nonvolatile memory is maintained. However, when the volatile memory is disabled, data stored in the volatile memory is not maintained. Similarly, data stored in the on-chip memory, register settings stored in the peripherals and/or other data is not maintained during the hibernation mode. Therefore, the device 102 must copy data from the volatile memory, the on-chip memory, the peripherals and/or other components to the nonvolatile memory prior to entering the hibernation mode. Thus, the nonvolatile memory may store a snapshot or snapshot data that enables the device 102 to restore data to the volatile memory, data to the on-chip memory, register settings to the peripherals and/or other data or settings prior to resuming system interactivity. Upon receiving a restore command, long-button press, detecting that an external power source is connected or other event trigger associated with a wake-up event, the device 102 may be unresponsive to a user until the components are enabled and the snapshot data is loaded into the on-chip memory, peripherals, volatile memory and/or other components.

Figure 7A:
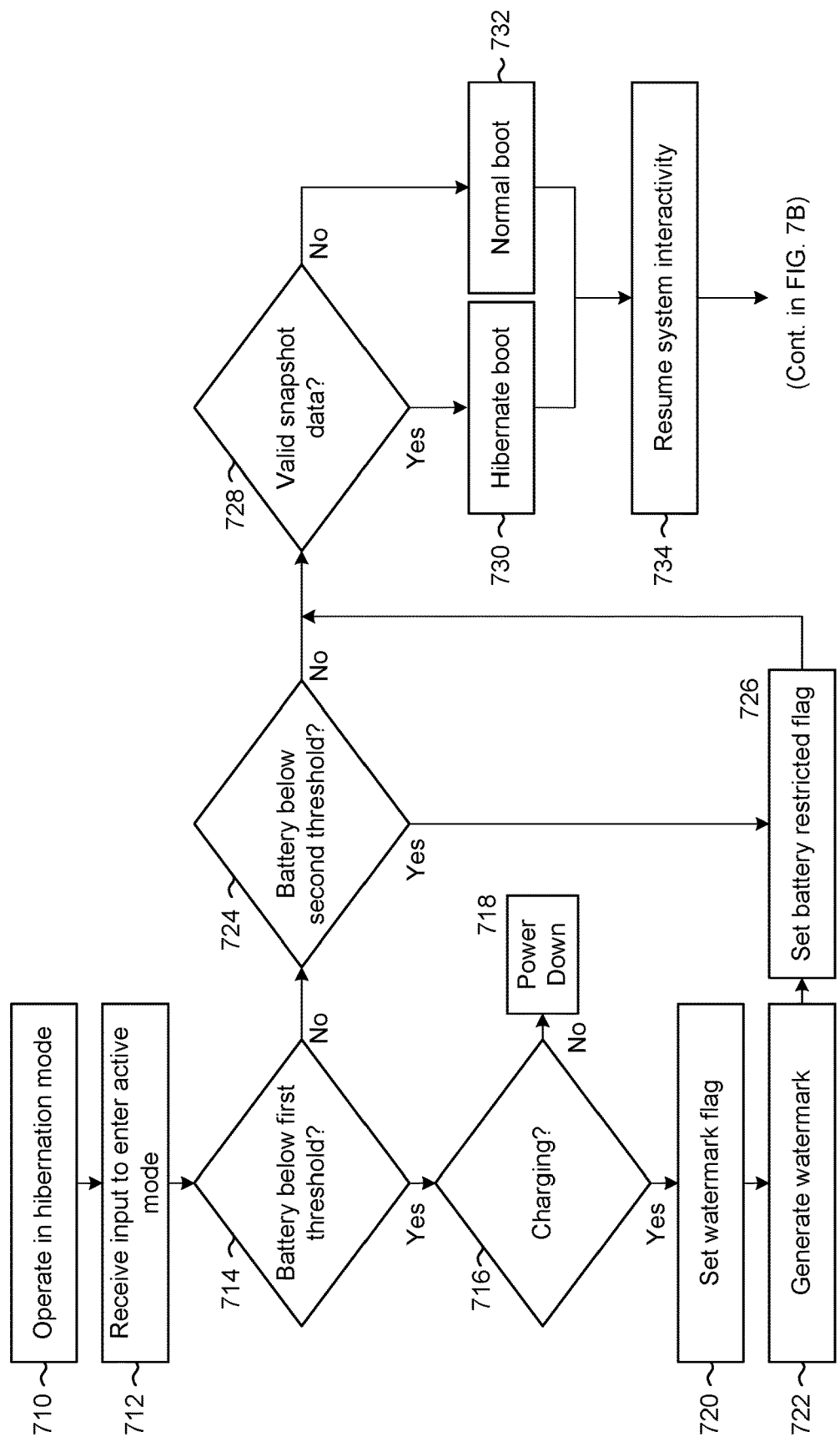
FIGS. 7A-7B are flowcharts conceptually illustrating example methods for resuming from hibernation when a device is charging from critical battery levels according to embodiments of the present disclosure.
Figure 7B:
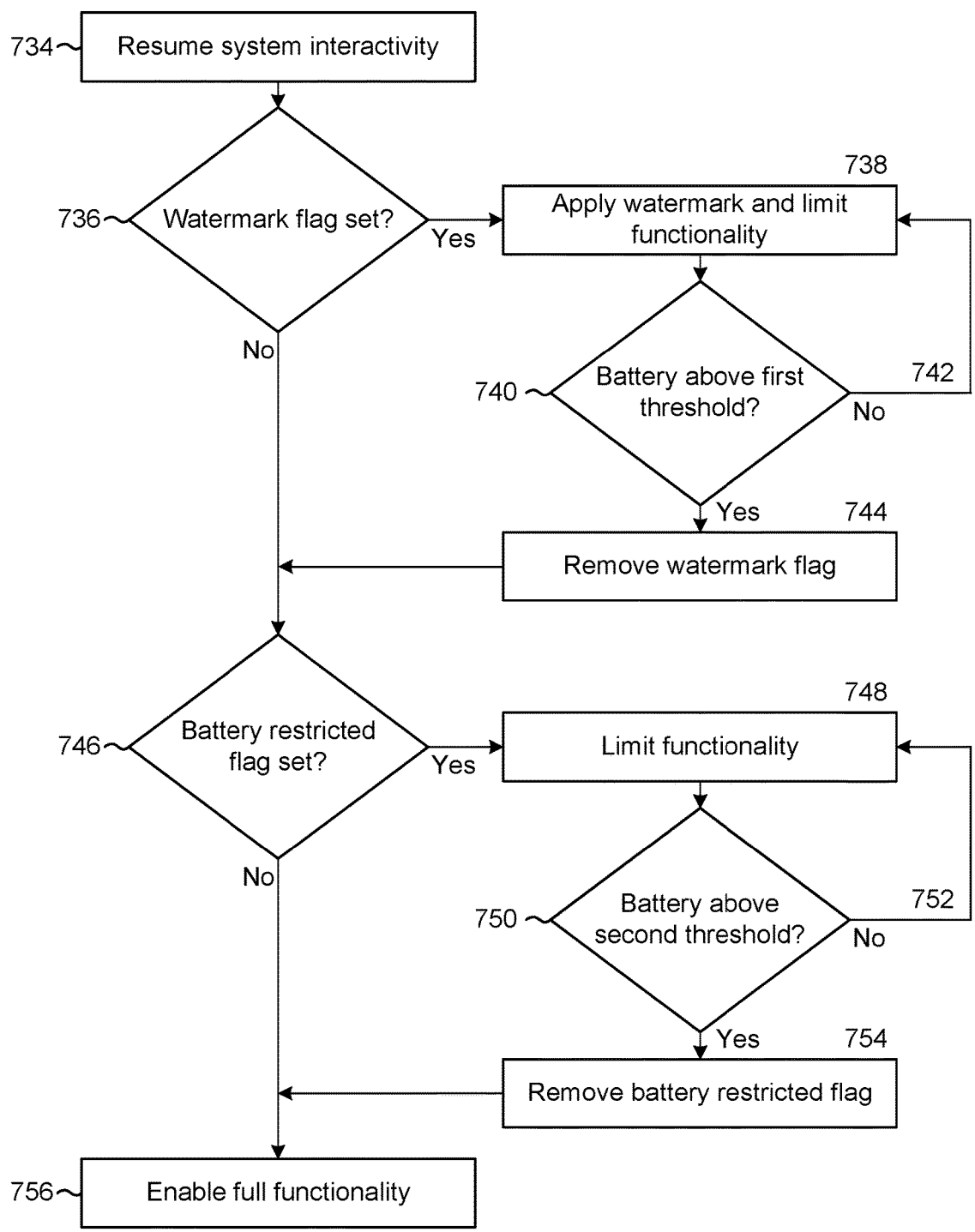

FIGS. 7A-7B are flowcharts conceptually illustrating example methods for resuming from hibernation when a device is charging from critical battery levels according to embodiments of the present disclosure. As illustrated in FIG. 7A, the device 102 may operate (710) in hibernation mode and receive (712) input to enter active mode. For example, the device 102 may receive a restore command, detect a long-button press, detect that an external power source is connected to the device 102 or receive other event triggers associated with a wake-up event. The device 102 may determine (714) if a battery charge level is below a first threshold (e.g., 3.5V-3.65V, 5-10% battery life remaining or the like) and, if the battery charge level is below the first threshold, the device 102 may determine (716) if an external power source is connected and the device 102 is charging.

If the device 102 is not connected to the external power source, the device 102 does not have enough battery power to resume normal operation. Therefore, the device 102 may power down (718) and continue to display the critical battery icon that was previously displayed during hibernation mode. When the device 102 powers down in step 718, the device 102 may not have sufficient battery life to enter the hibernation mode and therefore the device 102 may perform a normal shutdown to enter an "off" mode. Thus, when the device 102 is connected to an external power source and attempts to resume normal operation, the device 102 may perform a system boot (e.g., start an operating system of the device 102) instead of hibernation restore. However, the disclosure is not limited thereto and in some examples the device 102 may determine that there is sufficient battery life to enter the hibernation mode and may perform a hibernate shut down (e.g., enter the hibernation mode) in step 718.

If the device 102 determines that an external power source is connected, the device 102 may set (720) a watermark flag and generate (722) a watermark. The watermark flag may indicate to the device 102 to apply the watermark to content displayed by the device until the battery is charged above a threshold and the watermark flag is removed.

In some examples, if the device 102 determines in step 714 that the battery charge level is not below the first threshold, the device 102 may determine (724) if the battery charge level is below a second threshold higher than the first threshold (e.g., 3.65V, 10% battery life remaining or the like). If the battery charge level is below the second threshold, the device 102 may set (726) a battery restricted flag that limits a functionality of the device in order to reduce power consumption and/or high current draws. For example, the battery restricted mode may identify applications/processes having a high power consumption and may terminate the applications/processes or restrict functionality provided by the applications/processes in order to reduce the power consumption. Thus, the battery may charge more quickly in the battery restricted mode while a power consumption of the device 102 is reduced. However, the disclosure is not limited thereto and the device 102 may use a single threshold to set the watermark flag and the battery restricted flag. As the first threshold is lower than the second threshold, after generating the watermark in step 722, the device 102 may automatically set the battery restricted flag in step 726 and proceed to step 728.

If the device 102 determines that the battery charge level is not below the second threshold in step 724, or after setting the battery restricted flag in step 726, the device 102 may determine (728) if snapshot data is valid. For example, the device 102 may store data stored in volatile memory, data stored in on-chip memory, register settings stored in the peripherals and/or other data that isn't maintained when power is disabled as snapshot data in the volatile memory prior to entering the hibernation mode. The device 102 may determine if the snapshot data is valid, which indicates that the device 102 may restore the snapshot data, register settings and/or system settings and resume normal operation in the active mode. For example, if the device 102 previously entered the hibernation mode and the snapshot data is not corrupted, the device 102 may determine that the snapshot data is valid and may resume normal operation using hibernation restore (e.g., hibernate boot). However, if the snapshot data does not exist, is corrupted and/or if the device 102 previously powered down and entered an "off" state, as discussed above with regard to step 718, then the device 102 may determine that the snapshot data is invalid and may resume normal operation using system booting (e.g., normal boot).

If the snapshot data is valid, the device 102 may hibernate boot (730) the device 102 (e.g., perform a fast boot process), which means enter the active mode from hibernation mode by restoring the snapshot data, a process that takes a relatively short amount of time (e.g., 5-6 seconds). If the snapshot data is invalid, the device 102 may normal boot (732) the device 102 (e.g., slow boot process), which means entering the active mode by starting an operating system of the device 102 and initializing the device 102, a process that takes a relatively large amount of time (e.g., one minute).

If the battery restricted flag is set, the device 102 may modify the normal boot in step 732, for example by limiting display updates or limiting a number of applications/processes that are started. After entering the active mode, the device 102 may resume (734) system interactivity and be responsive to a user.

As illustrated in FIG. 7B, after resuming system interactivity the device 102 may determine (736) if a watermark flag is set. If the watermark flag is set, the device 102 may apply (738) the watermark and limit functionality of the device 102. The device 102 may determine (740) if a battery charge level is above the first threshold and, if not, may loop (742) to step 738 and continue to apply the watermark and limit functionality of the device 102. Once the battery charge level is above the first threshold, the device 102 may remove (744) the watermark flag.

If the device 102 determines that the watermark flag is not set in step 736, or after removing the watermark flag in step 744, the device 102 may determine (746) if the battery restricted flag is set. If the battery restricted flag is set, the device 102 may limit (748) functionality of the device without applying the watermark. The device 102 may determine (750) if the battery charge level is above a second threshold and, if not, may loop (752) to step 748 and continue to limit functionality of the device 102. Once the battery charge level is above the second threshold, the device 102 may remove (754) the battery restricted flag to enable full functionality.

If the device 102 determines that the battery restricted flag is not set in step 746, or after removing the battery restricted flag in step 754, the device 102 may enable (756) full functionality. For example, the device 102 may allow applications/processes associated with a high power consumption to run on the device 102 and/or may allow the applications/processes to perform all functionality available.

As discussed above, while FIG. 7B illustrates a first threshold and a second threshold, the disclosure is not limited thereto and the device 102 may use a single threshold for the watermark flag and the battery restricted flag. Thus, the device 102 may apply the watermark and limit functionality until the battery charge level is above the threshold, at which point the device 102 may enable full functionality. Additionally or alternatively, the second threshold may be lower than the first threshold, such that the device 102 may apply the watermark without limiting functionality.

Figure 8:
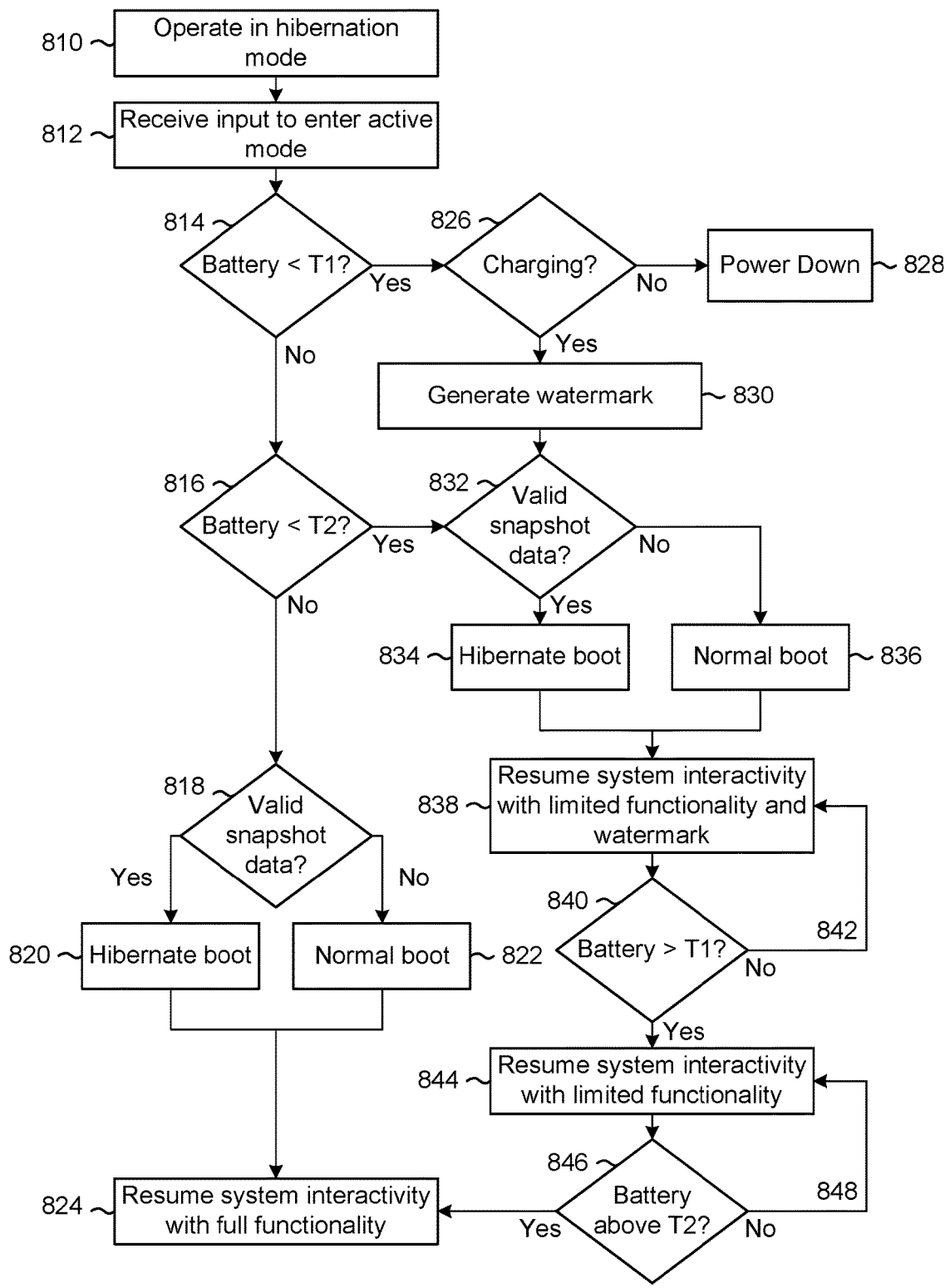
FIG. 8 is a flowchart conceptually illustrating an example method for resuming from hibernation when a device is charging from critical battery levels according to embodiments of the present disclosure.

FIG. 8 is a flowchart conceptually illustrating an example method for resuming from hibernation when a device is charging from critical battery levels according to embodiments of the present disclosure. As illustrated in FIG. 8, the device 102 may operate (810) in hibernation mode and may receive (812) input to enter an active mode. The device 102 may determine (814) if a battery charge level is below a first threshold and, if not, may determine (816) if the battery charge level is below a second threshold. If the battery charge level is not below the second threshold, the device 102 may determine (818) if snapshot data is valid. For example, if the device 102 previously entered the hibernation mode and the snapshot data is not corrupted, the device 102 may determine that the snapshot data is valid and may resume normal operation using hibernation restore (e.g., hibernate boot). However, if the snapshot data does not exist, is corrupted and/or if the device 102 previously powered down and entered an "off" state, then the device 102 may determine that the snapshot data is invalid and may resume normal operation using system booting (e.g., normal boot).

If the snapshot data is valid, the device 102 may hibernate boot (820) the device 102 (e.g., fast boot process) and enter the active mode using the snapshot data. If the snapshot data is invalid, the device 102 may normal boot (820) the device 102 (e.g., slow boot process) and start an operating system of the device 102 to enter the active mode. The device 102 may resume (824) system interactivity with full functionality.

If the device 102 determines in step 814 that the battery charge level is below the first threshold, the device 102 may determine (826) if an external power source is connected to the device 102 so that the battery is charging. If the external power source is not connected to the device 102, the device 102 may power down (828) and continue to display the critical battery icon that was previously displayed during hibernation mode. When the device 102 powers down in step 828, the device 102 may not have sufficient battery life to enter the hibernation mode and therefore the device 102 may perform a normal shutdown to enter an "off" mode. Thus, when the device 102 is connected to an external power source and attempts to resume normal operation, the device 102 may perform a system boot (e.g., start an operating system of the device 102) instead of hibernation restore. However, the disclosure is not limited thereto and in some examples the device 102 may determine that there is sufficient battery life to enter the hibernation mode and may perform a hibernate shut down (e.g., enter the hibernation mode) in step 828.

If the device 102 determines that an external power source is connected, the device 102 may generate (830) a watermark. After generating the watermark in step 830, or if the device 102 determines in step 816 that the battery charge level is below the second threshold, the device 102 may determine (832) if the snapshot data is valid, as discussed above with regard to step 818. If the snapshot data is valid, the device 102 may hibernate boot (834) and enter the active mode using the snapshot data. If the snapshot data is invalid, the device 102 may normal boot (836) and start an operating system of the device 102 to enter the active mode. The device 102 may resume (838) system interactivity with limited functionality and applying the watermark to displayed content.

The device 102 may determine (840) whether the battery charge level is above the first threshold and, if not, may loop (842) to step 838 and continue limiting functionality and applying the watermark. If the battery charge level is above the first threshold, the device 102 may resume (844) system interactivity with limited functionality without applying the watermark. The device 102 may determine (846) whether the battery charge level is above the second threshold, and if not, may loop (848) to step 844 and continue limiting functionality. If the battery charge level is above the second threshold, the device 102 may proceed to step 824 and resume system interactivity with full functionality.

Figure 9:
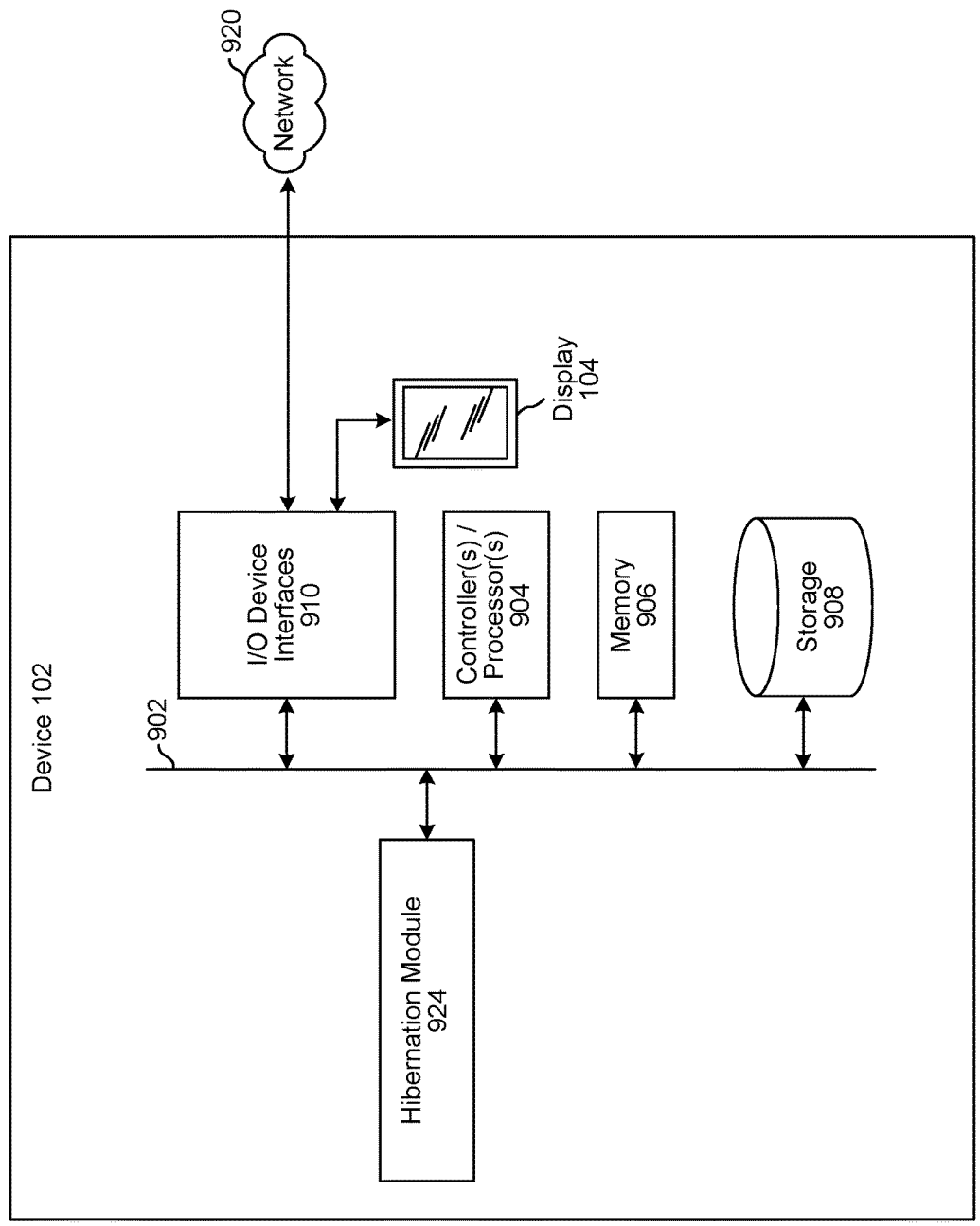
FIG. 9 is a block diagram conceptually illustrating example components of a system according to embodiments of the present disclosure.

FIG. 9 illustrates a block diagram conceptually illustrating example components of a system including a device 102. Other components not illustrated may also be included in the device 102 without departing from the disclosure, such as a power management integrated circuit (PMIC) configured to enable and/or disable components by managing a power supply to the components. In operation, the system may include computer-readable and computer-executable instructions that reside in storage 908 on the device 102. The device 102 may be a mobile electronic device including a battery. Examples of mobile electronic devices may include computers (e.g., a laptop, a tablet or the like), portable devices (e.g., a camera (such as a 360° video camera), smart phone, tablet or the like), media devices or the like. The device 102 may also be a component of any of the above-mentioned devices or systems.

As illustrated in FIG. 9, the device 102 may include an address/data bus 902 for conveying data among components of the device 102. Each component within the device 102 may also be directly connected to other components in addition to (or instead of) being connected to other components across the bus 902.

The device 102 may include one or more controllers/processors 904 comprising one-or-more central processing units (CPUs) for processing data and computer-readable instructions and a memory 906 for storing data and instructions. The memory 906 may include volatile random access memory (RAM), non-volatile read only memory (ROM), non-volatile magnetoresistive (MRAM) and/or other types of memory. The device 102 may also include a data storage component 908 for storing data and processor-executable instructions. The data storage component 908 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 910.

The device 102 includes input/output device interfaces 910. A variety of components may be connected to the device 102 through the input/output device interfaces 910. The input/output device interfaces 910 may be configured to operate with a network 920, for example a wireless local area network (WLAN) (such as WiFi), Bluetooth, ZigBee and/or wireless networks, such as a Long Term Evolution (LTE) network, WiMAX network, 3G network, etc. The network 920 may include a local or private network or may include a wide network such as the internet. Devices may be connected to the network 920 through either wired or wireless connections.

The input/output device interfaces 910 may also include an interface for an external peripheral device connection such as universal serial bus (USB), FireWire, Thunderbolt, Ethernet port or other connection protocol that may connect to networks 920. The input/output device interfaces 910 may also include a connection to an antenna (not shown) to connect one or more networks 920 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a hibernation module 924, which may comprise processor-executable instructions stored in storage 908 to be executed by controller(s)/processor(s) 904 (e.g., software, firmware), hardware, or some combination thereof. For example, components of the hibernation module 924 may be part of a software application running in the foreground and/or background on the device 102. The hibernation module 924 may control the device 102 as discussed above, for example with regard to FIGS. 1, 4, 5, 6, 7A, 7B, and/or 8. Some or all of the controllers/modules of the hibernation module 924 may be executable instructions that may be embedded in hardware or firmware in addition to, or instead of, software. In one embodiment, the device 102 may operate using an Android operating system (such as Android 4.3 Jelly Bean, Android 4.4 KitKat or the like), an Amazon operating system (such as FireOS or the like), or any other suitable operating system.

Executable computer instructions for operating the device 102 and its various components may be executed by the controller(s)/processor(s) 904, using the memory 906 as temporary "working" storage at runtime. The executable instructions may be stored in a non-transitory manner in non-volatile memory 906, storage 908, or an external device. Alternatively, some or all of the executable instructions may be embedded in hardware or firmware in addition to or instead of software.

The components of the device 102, as illustrated in FIG. 9, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for controlling a device powered by a battery, the method comprising:
   operating the device in an active mode;
   displaying first content;
   determining a charge level of the battery;
   determining to enter a hibernation mode, the hibernation mode disabling a supply of power from the battery to volatile memory and consuming less power than the active mode;
   storing operational data in solid-state storage, the operational data corresponding to device settings in the active mode;
   entering the hibernation mode;
   displaying second content indicating that the charge level is critically low;
   determining, while the device is in the hibernation mode, that an external power source is connected to the device while the charge level is below a first threshold;
   based at least in part on determining that the external power source is connected to the device while the charge level is below the first threshold:
      loading the operational data from the solid-state storage,
      displaying third content together with a watermark indicating that the charge level is below the first threshold, and
      entering the active mode;
   determining, while the device is operating in the active mode and the watermark is displayed, that the charge level is above the first threshold; and
   based at least in part on determining that the charge level is above the first threshold, displaying the third content without the watermark.

2. The computer-implemented method of claim 1, further comprising:
   determining that the charge level is below a second threshold;
   determining to limit functionality of the device to reduce a power consumption of the device;
   determining a first process running on the device;
   determining a power consumption associated with the first process;
   determining that the power consumption is above a third threshold; and
   ending the first process.

3. The computer-implemented method of claim 1, further comprising:
   determining that the operational data is stored in the solid-state storage;
   determining that the operational data is not corrupted; and
   performing a fast boot process to enter the active mode, the fast boot process restoring the device settings using the operational data in order to enter the active mode in less time than a slow boot process.

4. The computer-implemented method of claim 1, further comprising:
   setting a flag to a first value, the first value indicating that the charge level is below the first threshold;
   displaying the third content together with the watermark based at least in part on the flag having the first value;
   setting the flag to a second value, the second value indicating that the charge level is above the first threshold; and
   displaying the third content without the watermark based at least in part on the flag having the second value.

5. The computer-implemented method of claim 1, further comprising:
   receiving a command that causes the device to transition from the hibernation mode to the active mode.

6. A computer-implemented method, comprising:
   causing a device powered by a battery to transition to a first mode, including storing active data from volatile memory to nonvolatile memory and disabling a supply of power from the battery to the volatile memory;
   determining, while the device is operating in the first mode, that an external power source is connected to the device while a charge level of the battery is below a first threshold;
   based at least in part upon determining that the external power source is connected to the device while the charge level is below the first threshold:
      retrieving the active data from the nonvolatile memory,
      storing the active data in the volatile memory,
      determining first display data corresponding to the active data,
      displaying the first display data and a visible indication of a low battery condition, and
   operating the device in a second mode in which more power is consumed than in the first mode;
   determining, while the device is operating in the second mode and the visible indication is displayed, that the charge level is above the first threshold; and
   based at least in part on determining that the charge level is above the first threshold, displaying the first display data without the visible indication.

7. The computer-implemented method of claim 6, further comprising:
   determining that the charge level is below a second threshold;
   determining to limit functionality of the device to reduce a power consumption of the device;
   determining a first process running on the device;
   determining a power consumption associated with the first process;
   determining that the power consumption is above a third threshold; and
   ending the first process.

8. The computer-implemented method of claim 6, further comprising:
   determining that the active data is stored in the nonvolatile memory;
   determining that the active data is not corrupted, the active data corresponding to device settings in the second mode; and
   performing a fast boot process to enter the second mode, the fast boot process restoring the device settings using the active data to enter the second mode in less time than a slow boot process.

9. The computer-implemented method of claim 6, further comprising:
   determining that the active data is invalid, the active data corresponding to device settings in the second mode; and
   performing a slow boot process to enter the second mode, the slow boot process starting an operating system of the device and requiring more time to enter the second mode than a fast boot process.

10. The computer-implemented method of claim 6, further comprising:
setting a flag to a first value, the first value indicating that the charge level is below the first threshold; and
displaying the first display data and the visible indication based at least in part upon the flag having the first value.

11. The computer-implemented method of claim 6, wherein causing the device to transition to the first mode further comprises:
disabling a supply of power from the battery to a first peripheral of the device; and
disabling a supply of power from the battery to a central processing unit of the device.

12. The computer-implemented method of claim 6, further comprising:
receiving a command that causes the device to transition from the first mode to the second mode.

13. The computer-implemented method of claim 6, further comprising:
displaying, while operating the device in the first mode, second display data indicating that the charge level is low.

14. The computer-implemented method of claim 13, further comprising, prior to causing the device to transition to the first mode:
operating the device in the second mode;
displaying the first display data;
determining that the charge level is below a second threshold;
determining that the device is not connected to the external power source;
determining to enter the first mode;
determining the second display data; and
retrieving the active data from the volatile memory.

15. A device, comprising:
a battery,
at least one processor; and
a memory device including instructions operable to be executed by the at least one processor to configure the device to:
transition to a first mode including storing active data from volatile memory to nonvolatile memory and disabling a supply of power from the battery to the volatile memory;
determine, while the device is operating in the first mode, that an external power source is connected to the device while a charge level of the battery is below a first threshold; and
based at least in part upon determining that the external power source is connected to the device while the charge level of the battery is below the first threshold:
retrieve the active data from the nonvolatile memory,
store the active data in the volatile memory,
determine first display data corresponding to the active data,
display the first display data and a visible indication of a low battery condition, and
operate the device in a second mode in which more power is consumed than in the first mode;
determine, while the device is operating in the second mode and the visible indication is displayed, that the charge level is above the first threshold; and
based at least in part on determining that the charge level is above the first threshold, display the first display data without the visible indication.

16. The device of claim 15, wherein the memory device includes additional instructions operable to be executed by the at least one processor to further configure the device to:
determine that the charge level is below a second threshold;
determine to limit functionality of the device to reduce a power consumption of the device;
determine a first process running on the device;
determine a power consumption associated with the first process;
determine that the power consumption is above a third threshold; and
end the first process.

17. The device of claim 15, wherein the memory device includes additional instructions operable to be executed by the at least one processor to further configure the device to:
determine that the active data is stored in the nonvolatile memory;
determine that the active data is not corrupted, the active data corresponding to device settings in the second mode; and
perform a fast boot process to enter the second mode, the fast boot process restoring the device settings using the active data to enter the second mode in less time than a slow boot process.

18. The device of claim 15, wherein the memory device includes additional instructions operable to be executed by the at least one processor to further configure the device to:
determine that the active data is invalid, the active data corresponding to device settings in the second mode; and
perform a slow boot process to enter the second mode, the slow boot process starting an operating system of the device and requiring more time to enter the second mode than a fast boot process.

19. The device of claim 15, wherein the memory device includes additional instructions operable to be executed by the at least one processor to further configure the device to:
set a flag to a first value, the first value indicating that the charge level is below the first threshold; and
displaying the first display data and the visible indication based at least in part on the flag having the first value.

20. The device of claim 15, wherein the memory device includes additional instructions operable to be executed by the at least one processor to further configure the device to transition to the first mode by:
disabling a supply of power from the battery to a first peripheral of the device; and
disabling a supply of power from the battery to a central processing unit of the device.

21. The device of claim 15, wherein the memory device includes additional instructions operable to be executed by the at least one processor to further configure the device to:
receive a command that causes the device to transition from the first mode to the second mode.

22. The device of claim 15, wherein the memory device includes additional instructions operable to be executed by the at least one processor to further configure the device to:
display, while the device is operating in the first mode, second display data indicating that the charge level is low.

23. The device of claim 22, wherein the memory device includes additional instructions operable to be executed by the at least one processor to further configure the device to:
operate the device in the second mode;
display the first display data;

determine that the charge level is below a second threshold;
determine that the device is not connected to the external power source;
determine to enter the first mode;
determine the second display data; and
retrieve the active data from the volatile memory.

\* \* \* \* \*